United States Patent
Yoshida et al.

(10) Patent No.: US 12,194,403 B2
(45) Date of Patent: Jan. 14, 2025

(54) AIR FILTER AND INDOOR UNIT OF AIR-CONDITIONING APPARATUS

(71) Applicant: Mitsubishi Electric Corporation, Tokyo (JP)

(72) Inventors: Takanori Yoshida, Tokyo (JP); Shuhei Yokota, Tokyo (JP); Yusuke Mine, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 536 days.

(21) Appl. No.: 17/626,609

(22) PCT Filed: Oct. 3, 2019

(86) PCT No.: PCT/JP2019/039117
§ 371 (c)(1),
(2) Date: Jan. 12, 2022

(87) PCT Pub. No.: WO2021/064940
PCT Pub. Date: Apr. 8, 2021

(65) Prior Publication Data
US 2022/0258088 A1    Aug. 18, 2022

(51) Int. Cl.
*B01D 46/16* (2006.01)
*B01D 46/00* (2022.01)
(Continued)

(52) U.S. Cl.
CPC ......... *B01D 46/16* (2013.01); *B01D 46/0005* (2013.01); *B01D 46/4227* (2013.01);
(Continued)

(58) Field of Classification Search
CPC ......... F24F 8/108; B01D 46/16; B01D 46/62; B01D 46/4227; B01D 2265/028; B01D 2279/50; B01D 2275/205; B01D 46/0005
See application file for complete search history.

(56) References Cited

U.S. PATENT DOCUMENTS

| | | | |
|---|---|---|---|
| 10,690,376 B2* | 6/2020 | Ishigami | B01D 46/56 |
| 2007/0060036 A1* | 3/2007 | Shibuya | F24F 1/0073 |
| | | | 454/187 |
| 2018/0313573 A1 | 11/2018 | Ishigami et al. | |

FOREIGN PATENT DOCUMENTS

| CN | 1456848 A | 11/2003 |
|---|---|---|
| CN | 101165410 A | 4/2008 |

(Continued)

OTHER PUBLICATIONS

Office Action dated May 30, 2023 issued in corresponding CN patent application No. 201980100232.5 (and English Translation).

(Continued)

*Primary Examiner* — Robert Clemente
(74) *Attorney, Agent, or Firm* — Posz Law Group, PLC

(57) ABSTRACT

An air filter includes a frame portion including an outer frame and an inner frame. The outer frame is a frame body forming an outer contour and formed with an opening. The inner frame is provided within the outer frame and partitions the opening of the outer frame into a grid shape. A filter portion is provided on the frame portion to cover sections surrounded by the outer frame and the inner frame, the filter portion adsorbs dust, and one side of the frame portion is totally flat.

14 Claims, 15 Drawing Sheets

(51) Int. Cl.
*B01D 46/42* (2006.01)
*B01D 46/62* (2022.01)
*F24F 8/108* (2021.01)

(52) U.S. Cl.
CPC .............. *B01D 46/62* (2022.01); *F24F 8/108* (2021.01); *B01D 2265/028* (2013.01); *B01D 2275/205* (2013.01); *B01D 2279/50* (2013.01)

(56) References Cited

FOREIGN PATENT DOCUMENTS

| | | |
|---|---|---|
| CN | 107923633 A | 4/2018 |
| JP | H03-117829 A | 5/1991 |
| JP | H07-293993 A | 11/1995 |
| JP | H09-206534 A | 8/1997 |
| JP | H10205876 A | 8/1998 |
| JP | 2001157808 A | 6/2001 |
| JP | 2004257620 A | 9/2004 |
| JP | 2006153445 A | 6/2006 |

OTHER PUBLICATIONS

Office Action dated Jan. 11, 2023 issued in corresponding CN patent application No. 201980100232.5 (and English machine translation).
Decision of Rejection dated Sep. 22, 2023 issued in corresponding CN Patent Application No. 201980100232.5 (and English machine translation).
International Search Report dated Dec. 24, 2019, issued in corresponding International Patent Application No. PCT/JP2019/039117 (and English Machine Translation).

\* cited by examiner

Comparative Example

AIR FILTER AND INDOOR UNIT OF AIR-CONDITIONING APPARATUS

CROSS REFERENCE TO RELATED APPLICATION

This application is a U.S. National Stage Application of International Application No. PCT/JP2019/039117, filed on Oct. 3, 2019, the contents of which are incorporated herein by reference.

TECHNICAL FIELD

The present disclosure relates to an air filter to which an air cleaning filter is attached, and also relates to an indoor unit of an air-conditioning apparatus in which the indoor unit includes the air filter.

BACKGROUND ART

Air filters have heretofore been known as being provided in an indoor unit of an air-conditioning apparatus to clean air sucked from an air inlet by adsorbing dust and other particles contained in the air. As one of the air filters as described above, an air filter to which an air cleaning filter is attached has also been known as further cleaning the sucked air by adsorbing fine particles contained in the air, such as pollen. Patent Literature 1 discloses an air filter including an attachment frame formed with notches as an attachment frame to which an air cleaning filter is attached. Patent Literature 1 aims to provide the air filter that facilitates attachment/ detachment of the air cleaning filter by forming the notches on the attachment frame to decrease its rigidity and make it easy to bend the air filter. The air filter disclosed in Patent Literature 1 includes an attachment portion provided on the back side of the air filter to attach the air cleaning filter thereto, the back side being directed toward the inside of the indoor unit when the air filter is attached to the indoor unit. The air filter also includes a portion from which a tab protrudes on the front side of the air filter directed toward the room, the tab being used by a user to attach the air filter.

CITATION LIST

Patent Literature

Patent Literature 1: Japanese Unexamined Patent Application Publication No. 2001-157808

SUMMARY OF INVENTION

Technical Problem

However, the air filter in Patent Literature 1 does not have a side that is totally flat. It is thus difficult to stack the air filter in Patent Literature 1 on top of another when the air filters are packed, which leads to an increase in the stack height. Therefore, the packing efficiency decreases, while transportation-related costs increase.

The present disclosure has been achieved to solve the above problems, and an objective of the present disclosure is to provide an air filter that leads to improvement in packing efficiency and a decrease in transportation-related costs.

Solution to Problem

An air filter according to one embodiment of the present disclosure includes: a frame portion including an outer frame and an inner frame, the outer frame being a frame body forming an outer contour and formed with an opening, the inner frame being provided within the outer frame and configured to partition the opening of the outer frame into a grid shape; and a filter portion provided on the frame portion to cover sections surrounded by the outer frame and the inner frame, the filter portion being configured to adsorb dust, wherein one side of the frame portion is totally flat.

Advantageous Effects of Invention

According to one embodiment of the present disclosure, one side of the air filter is totally flat. Due to this configuration, one side of the air filter is not provided with such a protruding portion as to interfere with another air filter when the air filters are packed, so that the air filter can be stacked on top of another with their flat sides facing each other. That is, the air filter is easy to stack on top of another, and reduces the space required for being packed. Therefore, the packing efficiency improves, and consequently transportation-related costs can be decreased.

DESCRIPTION OF EMBODIMENT

Embodiment 1

Figure 1:
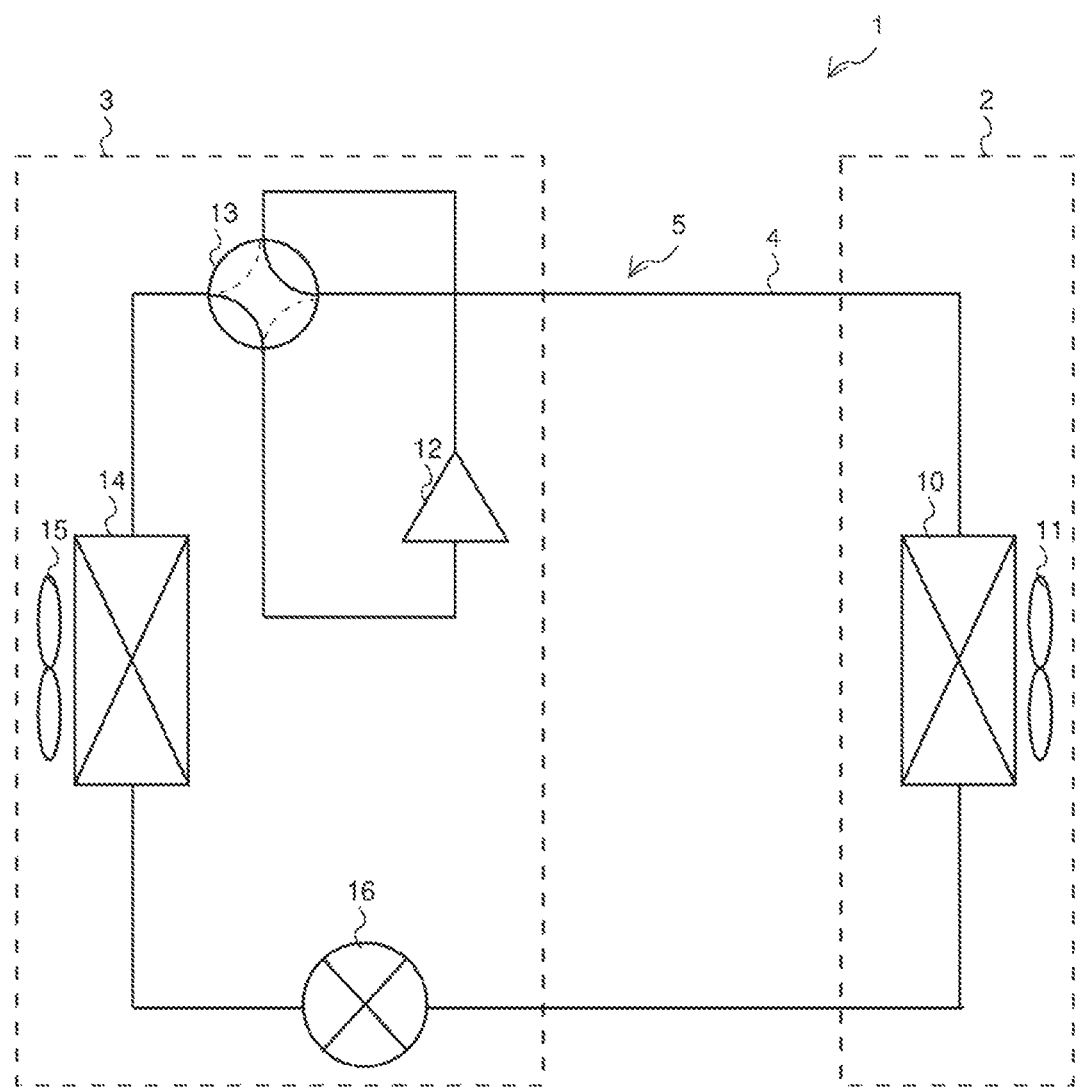
FIG. 1 is a circuit diagram illustrating an air-conditioning apparatus 1 in Embodiment 1.

An air-conditioning apparatus 1 according to Embodiment 1 will be described hereinafter with reference to the drawings. FIG. 1 is a circuit diagram illustrating the air-conditioning apparatus 1 according to Embodiment 1. As shown in FIG. 1, the air-conditioning apparatus 1 includes an outdoor unit 3, an indoor unit 2, and a refrigerant pipe 4.

Note that FIG. 1 illustrates a single indoor unit 2 as an example, however, the number of indoor units 2 may be equal to or larger than two.

(Outdoor Unit 3, Indoor Unit 2, and Refrigerant Pipe 4)

The outdoor unit 3 includes a compressor 12, a flow switching device 13, an outdoor heat exchanger 14, an outdoor air-sending device 15, and an expansion unit 16. The indoor unit 2 includes an indoor heat exchanger 10 and an indoor air-sending device 11. The refrigerant pipe 4 connects the compressor 12, the flow switching device 13, the outdoor heat exchanger 14, the expansion unit 16, and the indoor heat exchanger 10 to form a refrigerant circuit 5 through which refrigerant flows.

(Compressor 12, Flow Switching Device 13, Outdoor Heat Exchanger 14, Outdoor Air-Sending Device 15, and Expansion Unit 16)

The compressor 12 sucks refrigerant in a low-temperature and low-pressure state, compresses the sucked refrigerant into a high-temperature and high-pressure state, and discharges the compressed refrigerant. The flow switching device 13 changes the flow direction of refrigerant in the refrigerant circuit 5, and is, for example, a four-way valve. The outdoor heat exchanger 14 exchanges heat between refrigerant and outside air, and is, for example, a fin-and-tube heat exchanger. The outdoor heat exchanger 14 functions as a condenser during cooling operation, and functions as an evaporator during heating operation. The outdoor air-sending device 15 is configured to deliver outside air to the outdoor heat exchanger 14. The expansion unit 16 is a pressure reducing valve or an expansion valve configured to reduce the pressure of refrigerant and expand the refrigerant.

(Indoor Heat Exchanger 10 and Indoor Air-Sending Device 11)

The indoor heat exchanger 10 exchanges heat between room air and refrigerant. The indoor heat exchanger 10 functions as an evaporator during cooling operation, and functions as a condenser during heating operation. The indoor air-sending device 11 is configured to deliver room air to the indoor heat exchanger 10, and is, for example, a cross flow fan.

(Cooling Operation)

Operation of the air-conditioning apparatus 1 is now described. First, cooling operation is described. During cooling operation, refrigerant sucked into the compressor 12 is compressed by the compressor 12 into a high-temperature and high-pressure gas state and then discharged. The refrigerant in a high-temperature and high-pressure gas state discharged from the compressor 12 passes through the flow switching device 13 and flows into the outdoor heat exchanger 14 that functions as a condenser. Refrigerant having flowed into the outdoor heat exchanger 14 exchanges heat with outside air delivered by the outdoor air-sending device 15, and condenses into liquid. The refrigerant in a liquid state flows into the expansion unit 16, and is reduced in pressure and expanded, so that the refrigerant is brought into a low-temperature and low-pressure two-phase gas-liquid state. The refrigerant in the two-phase gas-liquid state flows into the indoor heat exchanger 10 that functions as an evaporator. Refrigerant having flowed into the indoor heat exchanger 10 exchanges heat with room air delivered by the indoor air-sending device 11, and evaporates into gas. At this time, the room air is cooled and thus cooling is performed in the room. Thereafter, the refrigerant having evaporated into a low-temperature and low-pressure gas state passes through the flow switching device 13 and is sucked into the compressor 12.

(Heating Operation)

Next, heating operation is described. During heating operation, refrigerant sucked into the compressor 12 is compressed by the compressor 12 into a high-temperature and high-pressure gas state and then discharged. The refrigerant in a high-temperature and high-pressure gas state discharged from the compressor 12 passes through the flow switching device 13 and flows into the indoor heat exchanger 10 that functions as a condenser. Refrigerant having flowed into the indoor heat exchanger 10 exchanges heat with room air delivered by the indoor air-sending device 11, and condenses into liquid. At this time, the room air is heated and thus heating is performed in the room. The refrigerant in a liquid state flows into the expansion unit 16, and is reduced in pressure and expanded, so that the refrigerant is brought into a low-temperature and low-pressure two-phase gas-liquid state. The refrigerant in the two-phase gas-liquid state flows into the outdoor heat exchanger 14 that functions as an evaporator. Refrigerant having flowed into the outdoor heat exchanger 14 exchanges heat with outside air delivered by the outdoor air-sending device 15, and evaporates into gas. Thereafter, the refrigerant having evaporated into a low-temperature and low-pressure gas state passes through the flow switching device 13 and is sucked into the compressor 12.

Figure 2:
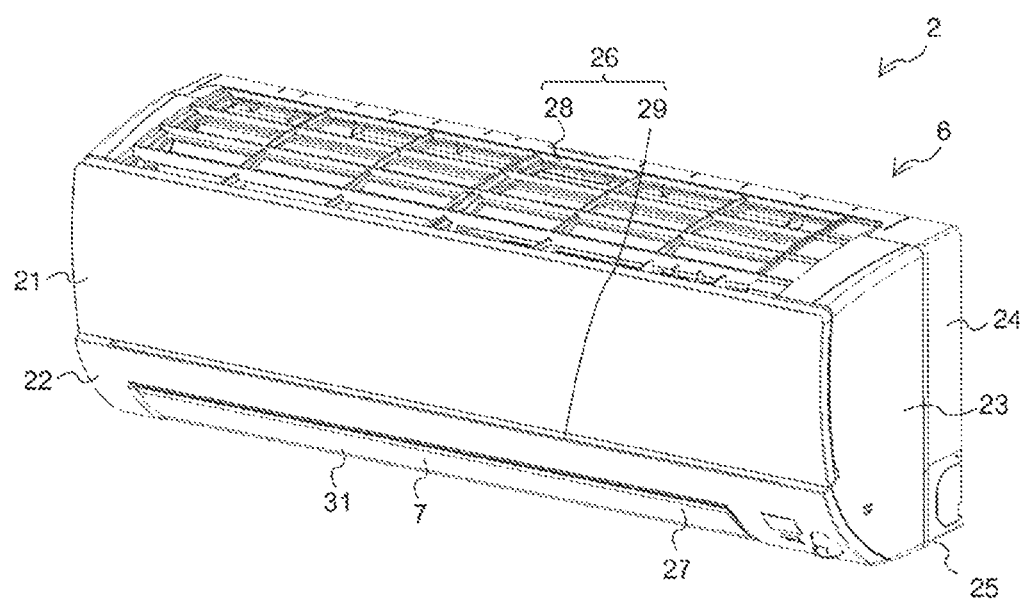
FIG. 2 is a perspective view of an indoor unit 2 according to Embodiment 1.
Figure 3:
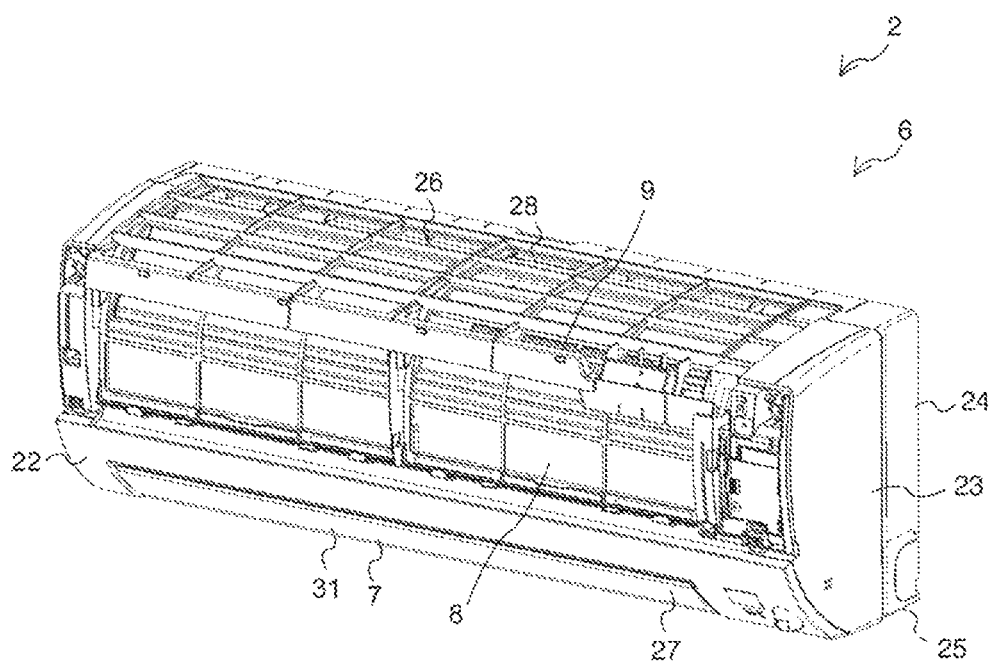
FIG. 3 is a perspective view of the indoor unit 2 according to Embodiment 1.
Figure 4:
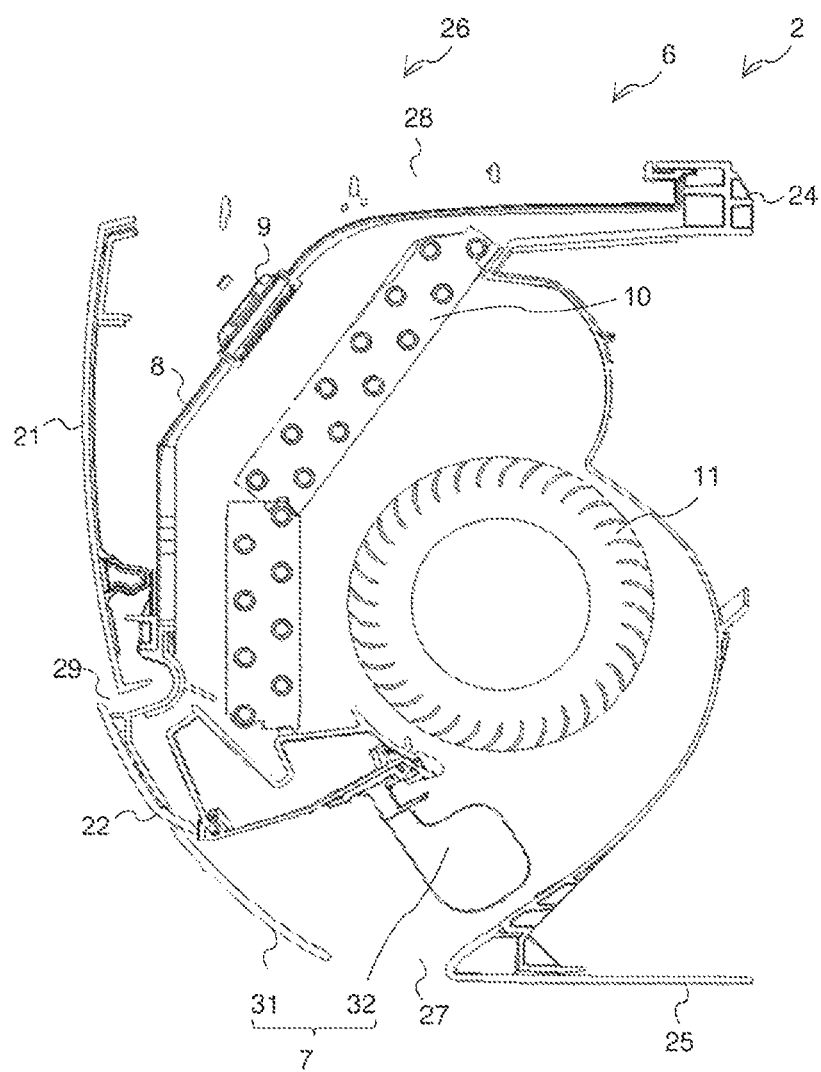
FIG. 4 is an internal configuration diagram of the indoor unit 2 according to Embodiment 1.

FIG. 2 is a perspective view of the indoor unit 2 according to Embodiment 1. FIG. 3 is a perspective view of the indoor unit 2 according to Embodiment 1. FIG. 4 is an internal configuration diagram of the indoor unit 2 according to Embodiment 1. As shown in FIGS. 2 to 4, the indoor unit 2 includes a housing 6, the indoor heat exchanger 10, the indoor air-sending device 11, a flow deflector plate 7, an air filter 8, and an air cleaning filter 9.

(Housing 6)

The housing 6 forms the outer casing of the indoor unit 2, and is made of, for example, resin. The housing 6 is made up of a front upper panel 21, a front lower panel 22, an outer-casing panel 23, a rear panel 24, and a bottom panel 25. The housing 6 is formed with an air inlet 26 and an air outlet 27. The front upper panel 21 is a part forming the upper portion of the front side of the housing 6. The front lower panel 22 is a part forming the lower portion of the front side of the housing 6. The outer-casing panel 23 is a part forming the top side and opposite sides of the housing 6. The bottom panel 25 is a part forming the bottom side of the indoor unit 2.

The air inlet 26 is an opening port through which air around the indoor unit 2 is sucked into the indoor unit 2. The air inlet 26 is made up of a top air inlet 28 and a front air inlet 29. The top air inlet 28 is formed on the top side of the outer-casing panel 23. The front air inlet 29 is formed between the front upper panel 21 and the front lower panel 22. Note that the air inlet 26 may be made up of either the top air inlet 28 or the front air inlet 29. The air outlet 27 is an opening port through which air sucked into the indoor unit 2 is blown to an air-conditioned space. The air outlet 27 is formed on the bottom panel 25.

(Indoor Heat Exchanger 10 and Indoor Air-Sending Device 11)

The indoor heat exchanger 10 is provided in the housing 6 such that the indoor heat exchanger 10 extends from the front side toward the rear of the top side of the housing 6. The indoor air-sending device 11 is provided in the housing 6 across almost the entire width of the housing 6.

(Flow Deflector Plate 7)

The flow deflector plate 7 is a plate-like part provided at the lower portion of the housing 6. The flow deflector plate 7 includes an up-down flow deflector plate 31 and side-toside flow deflector plates 32. The up-down flow deflector plate 31 covers the air outlet 27 when the air-conditioning apparatus 1 stops operation. The up-down flow deflector plate 31 is driven by a motor (not shown) and capable of swinging in the upward/downward direction when the indoor unit 2 is in operation. The up-down flow deflector plate 31 adjusts the upward/downward flow direction of air to be blown from the air outlet 27 by maintaining or changing the plate opening degree. Note that the number of up-down flow deflector plates 31 may be equal to or larger than two. When the air-conditioning apparatus 1 stops operation, the up-down flow deflector plates 31 are closed. At this time, the air outlet is partially covered with all the up-down flow deflector plates 31. However, the air outlet 27 is not limited to being covered partially, but may be covered in its entirety.

A plurality of side-to-side flow deflector plates 32, each of which is a plate-like part, are provided at the lower portion of the housing 6. The side-to-side flow deflector plates 32 are driven by the motor (not shown) and capable of swinging in the rightward/leftward direction. The side-to-side flow deflector plates 32 adjust the sideward flow direction of air to be blown from the indoor unit 2 by maintaining or changing the plate angle.

(Air Filter 8)

Figure 5:
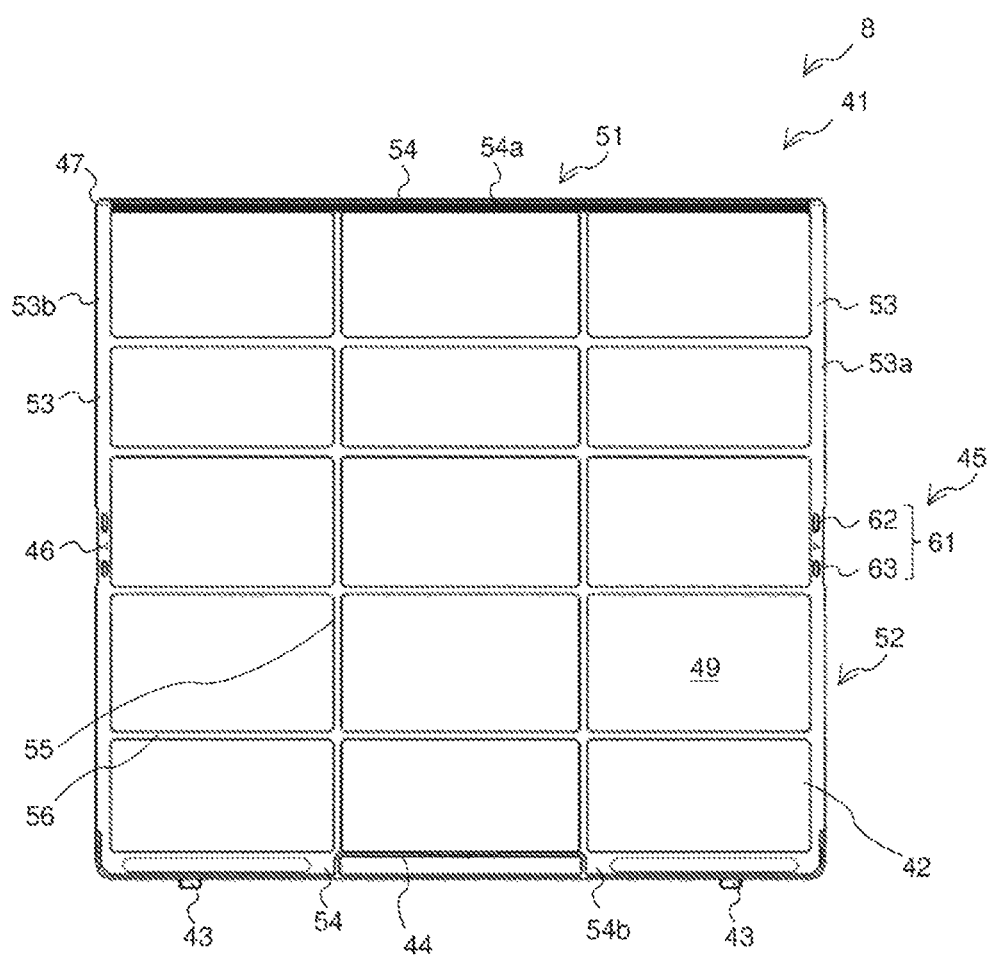
FIG. 5 is a front view of an air filter 8 according to Embodiment 1.
Figure 6:
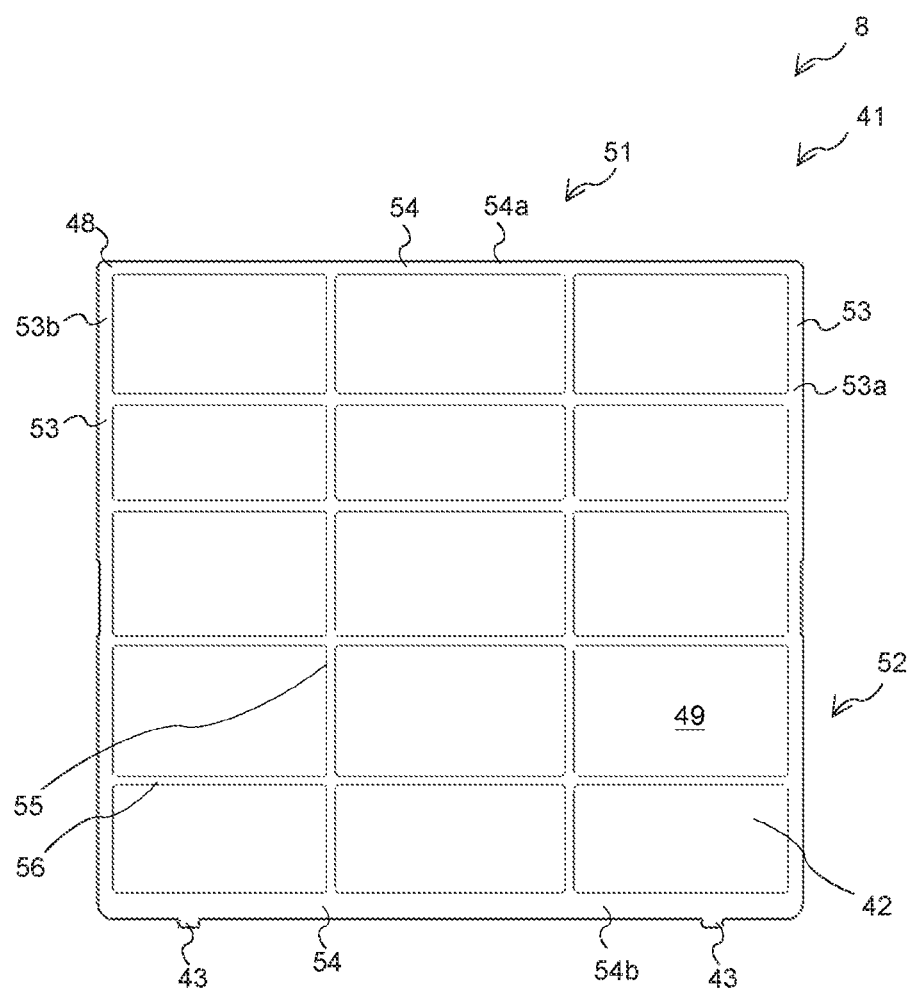
FIG. 6 is a rear view of the air filter 8 according to Embodiment 1.

FIG. 5 is a front view of the air filter 8 according to Embodiment 1. FIG. 6 is a rear view of the air filter 8 according to Embodiment 1. The air filter 8 is a part provided in the housing 6 such that the air filter 8 covers the indoor heat exchanger 10, and configured to remove dust from the air sucked from the air inlet 26 by adsorbing the dust. As shown in FIGS. 5 and 6, the air filter 8 includes a frame portion 41, a dust collection portion 42, insertion portions 43, a tab 44, and attachment portions 45. The air filter 8 has a front side 47 directed toward the room when the air filter 8 is attached to the indoor unit 2. The front side 47 is positioned on the upstream side of air sucked into the indoor unit 2. The air filter 8 also has a back side 48 directed toward the inside of the indoor unit 2 when the air filter 8 is attached to the indoor unit 2. The back side 48 is positioned on the downstream side of the air sucked into the indoor unit 2. Furthermore, the length of each part of the air filter 8 in the direction toward which the front side 47 faces or the back side 48 faces is represented as a thickness.

(Frame Portion 41)

The frame portion 41 is made up of an outer frame 51 and an inner frame 52. The outer frame 51 is a frame body that forms the outer contour of the air filter 8, and that is formed with an opening 49 in the center. The outer frame 51 is made up of vertical outer frames 53 and horizontal outer frames 54. The vertical outer frames 53 are parts extending in the upward/downward direction, and forming the right-side and left-side outer contour of the outer frame 51. Further, the vertical outer frames 53 are made up of a right-side outer frame 53a and a left-side outer frame 53b. The right-side outer frame 53a is a part positioned on the right side of the air filter 8 relative to the front side 47. The left-side outer frame 53b is a part positioned on the left side of the air filter 8 relative to the front side 47. The horizontal outer frames 54 are parts extending in the rightward/leftward direction, and forming the upper and lower outer contour of the outer frame 51. Furthermore, the horizontal outer frames 54 are made up of an upper outer frame 54a and a lower outer frame 54b. The upper outer frame 54a is a part positioned on the top side of the air filter 8. The lower outer frame 54b is a part positioned on the bottom side of the air filter 8.

The inner frame 52 is a part made up of a plurality of vertical inner frames 55 and a plurality of horizontal inner frames 56, and configured to partition the opening 49 of the outer frame 51 into a grid shape. Each of the vertical inner frames 55 is a part extending in the upward/downward direction, and configured to divide the opening 49 of the outer frame 51 into the right-side and left-side openings. Each of the horizontal inner frames 56 is a part extending in the rightward/leftward direction, and configured to divide the opening 49 of the outer frame 51 into the upper and lower openings. The vertical outer frames 53 and the vertical inner frames 55 extend in parallel to each other. The horizontal outer frames 54 and the horizontal inner frames 56 extend in parallel to each other.

(Dust Collection Portion 42)

The dust collection portion 42 is a filter provided to cover the sections surrounded by the outer frame 51 and the inner frame 52, and configured to adsorb dust. The dust collection portion 42 in a stretched state without warping is heat-welded to the back side 48 of the outer frame 51 and the inner frame 52.

(Insertion Portion 43)

Each of the insertion portions 43 is a part protruding downward from the lower outer frame 54b. The insertion portions 43 are inserted into respective insertion receiving portions (not shown) provided on the front side of the outer-casing panel 23. This allows the air filter 8 to be fixed to and attached to the housing 6.

(Tab 44)

The tab 44 is a part protruding from the front side 47 of the air filter 8 on the lower outer frame 54b. The tab 44 is used to attach/detach the frame portion 41 by a user holding the tab 44 with his/her fingers. This improves the ease of operation of the air filter 8 to be attached/detached.

(Attachment Portion 45)

Figure 7:
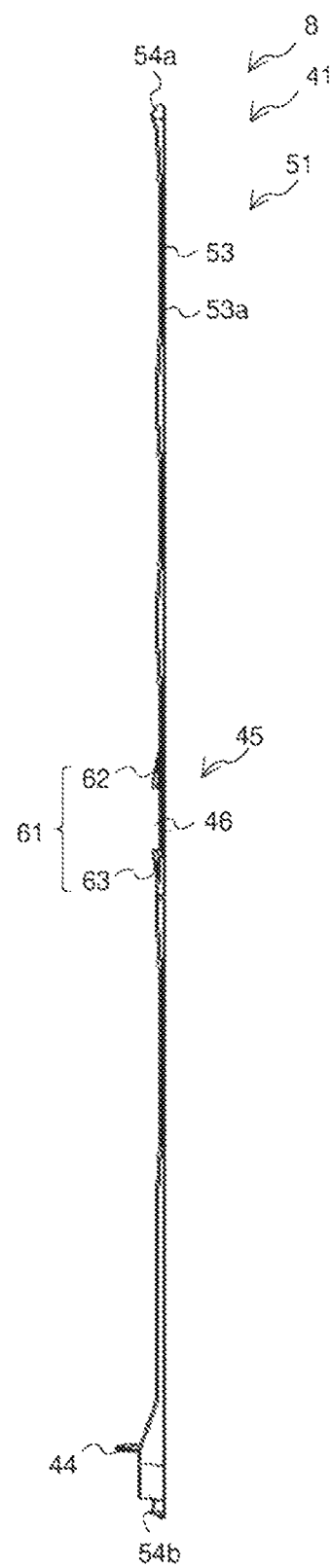
FIG. 7 is a side view of the air filter 8 according to Embodiment 1.
Figure 8:
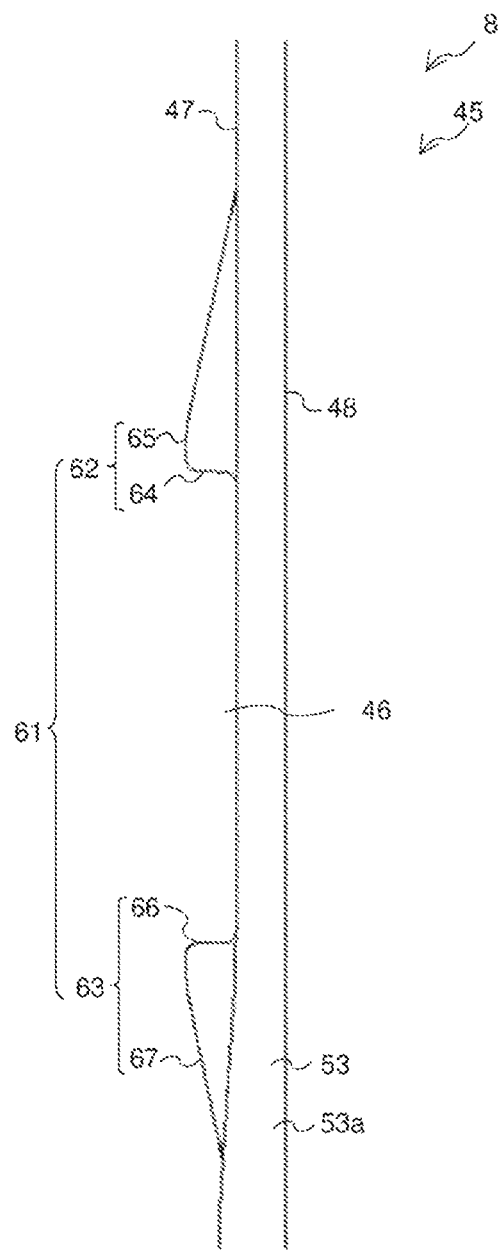
FIG. 8 is a side view of the air filter 8 according to Embodiment 1.

FIG. 7 is a side view of the air filter 8 according to Embodiment 1. FIG. 8 is a side view of the air filter 8 according to Embodiment 1. Each of the attachment portions 45 is a part to which the air cleaning filter 9 is attached. As shown in FIGS. 7 and 8, each of the attachment portions 45 includes protruding portions 61 protruding from the front side 47 of the air filter 8 such that the protruding portions 61 extend in the upward/downward direction. Two protruding portions 61 are provided on the right-side outer frame 53a, while additional two protruding portions 61 are provided on the left-side outer frame 53b. Note that three or more protruding portions 61 may be provided. Each of the protruding portions 61 is formed to have a thickness equal to or less than the thickness of the tab 44. Further, on the outer frame 51, attachment grooves 46 are formed, each of which is formed between a plurality of protruding portions 61, and has a shape relatively thinner than the protruding portions 61.

The protruding portions 61 include an upper protruding portion 62 and a lower protruding portion 63. The upper protruding portion 62 is positioned uppermost of the plurality of protruding portions 61. The upper protruding portion 62 is made up of an upper perpendicular face 64 and an upper sloped face 65. The upper perpendicular face 64 extends perpendicularly from the front side 47. The upper sloped face 65 extends obliquely upward from the tip end of the upper perpendicular face 64 such that the vertical outer frame 53 becomes gradually thinner, and then connects to the front side 47. The lower protruding portion 63 is positioned lowermost of the plurality of protruding portions 61. The lower protruding portion 63 is made up of a lower perpendicular face 66 and a lower sloped face 67. The lower perpendicular face 66 is formed to extend perpendicularly from the front side 47. The lower sloped face 67 extends obliquely downward from the tip end of the lower perpendicular face 66 such that the vertical outer frame 53 becomes gradually thinner, and then connects to the front side 47.

The back side 48 of the air filter 8 is not provided with any protruding parts that protrude from the back side 48, such as the tab 44 or the attachment portions 45. That is, the air filter 8 has a side that is totally flat.

(Air Cleaning Filter 9)

Figure 9:
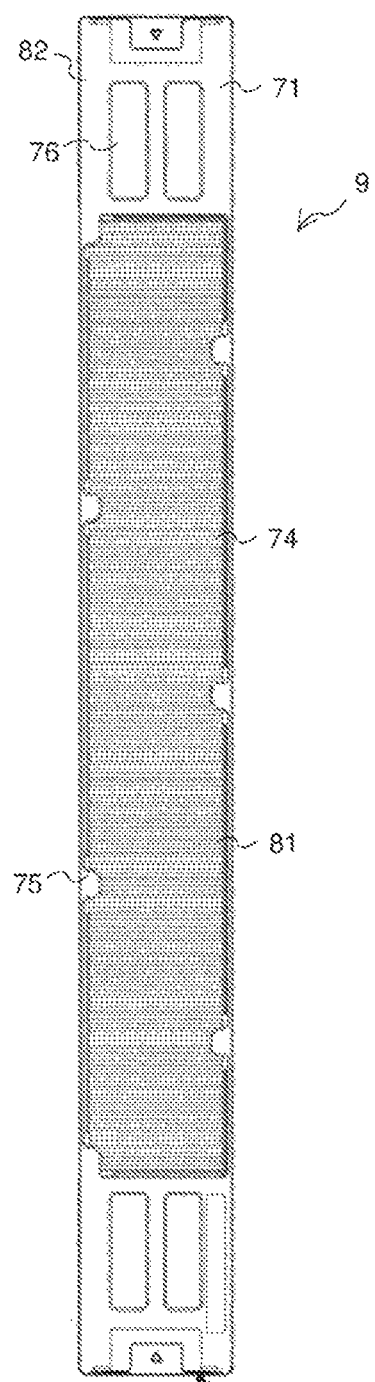
FIG. 9 is a front view of an air cleaning filter 9 according to Embodiment 1.
Figure 10:
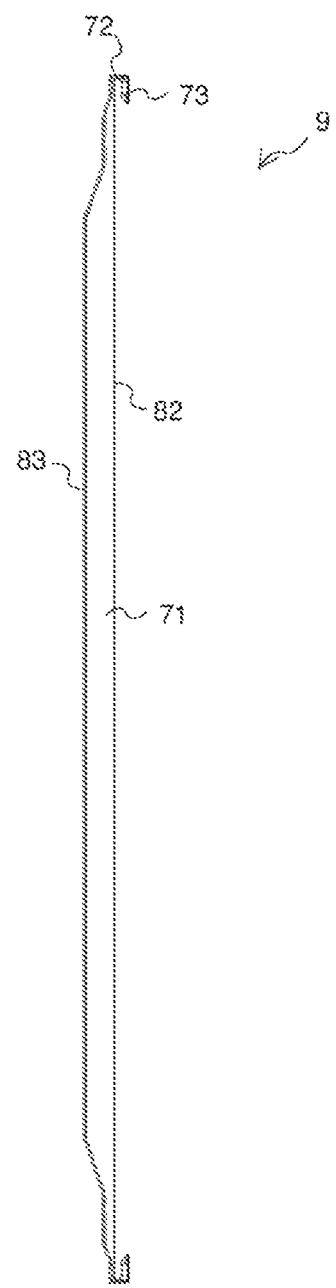
FIG. 10 is a side view of the air cleaning filter 9 according to Embodiment 1.

FIG. 9 is a front view of the air cleaning filter 9 according to Embodiment 1. FIG. 10 is a side view of the air cleaning filter 9 according to Embodiment 1. The air cleaning filter 9 is a part attached to the back side 48 of the air filter 8, and configured to remove finer particles than dust, such as pollen, from the air sucked from the air inlet 26 by adsorbing the finer particles. Note that the particles are defined as having an average particle diameter smaller than that of dust, assuming that the dust is regarded as particulate material. The air cleaning filter 9 includes a fixing portion 71, support portions 72, latch portions 73, and an air cleaning portion 74. Note that the air cleaning filter 9 may not be provided if unnecessary. The air cleaning filter 9 has a front side 82 directed toward the room when the air cleaning filter 9 is attached to the air filter 8. The front side 82 is positioned on the upstream side of air sucked into the indoor unit 2. The air cleaning filter 9 also has a back side 83 directed toward the inside of the indoor unit 2 when the air cleaning filter 9 is attached to the air filter 8. The back side 83 is positioned on the downstream side of the air sucked into the indoor unit 2. Similarly to the air filter 8, the length of each part of the air cleaning filter 9 in the direction toward which the front side 82 faces or the back side 83 faces is represented as a thickness.

(Fixing Portion 71, Support Portion 72, and Latch Portion 73)

The fixing portion 71 is a part forming the outer contour of the air cleaning filter 9. The fixing portion 71 is a frame body extending from side to side and formed with an opening 81 in the center. When the air cleaning filter 9 is attached to the air filter 8, the fixing portion 71 extends almost parallel to the frame portion 41. On laterally opposite sides of the fixing portion 71, air holes 76 are provided bilaterally symmetrically with reference to the air cleaning portion 74. Note that the air holes 76 may not be bilaterally symmetrical with each other, and the number of the air holes 76 is not particularly limited. The fixing portion 71 includes a plurality of cleaning-portion fixing latches 75. Each of the cleaning-portion fixing latches 75 is a part protruding toward the opening 81 of the fixing portion 71. The air cleaning portion 74 is engaged with the cleaning-portion fixing latches 75.

Each of the support portions 72 is a part connected to the fixing portion 71 and extending toward the front side. That is, each of the support portions 72 extends toward the back side 48 of the air filter 8. Each of the latch portions 73 is a part connected to each of the support portions 72 and extending along the fixing portion 71. The latch portions 73 fit in the attachment grooves 46, and hold the frame portion 41 of the air filter 8 between the fixing portion 71 and each of the latch portions 73. Note that a plurality of latch portions 73 may be provided. When the thickness of the space formed between the latch portion 73 and the fixing portion 71 is represented as α, and the thickness of the outer frame 51 is represented as β, then β+0.3 mm≤α≤β+1.0 mm is satisfied.

(Air Cleaning Portion 74)

The air cleaning portion 74 is a filter provided in the fixing portion 71 such that the air cleaning portion 74 covers the opening 81 of the fixing portion 71, and configured to adsorb finer particles than dust, such as pollen. The air cleaning portion 74 is engaged with the cleaning-portion fixing latches 75. Due to this engagement, even when the air cleaning portion 74 is made of, for example, soft raw material, the air cleaning portion 74 is not easily disengaged from, but can still be fixed to, the fixing portion 71.

Figure 11:
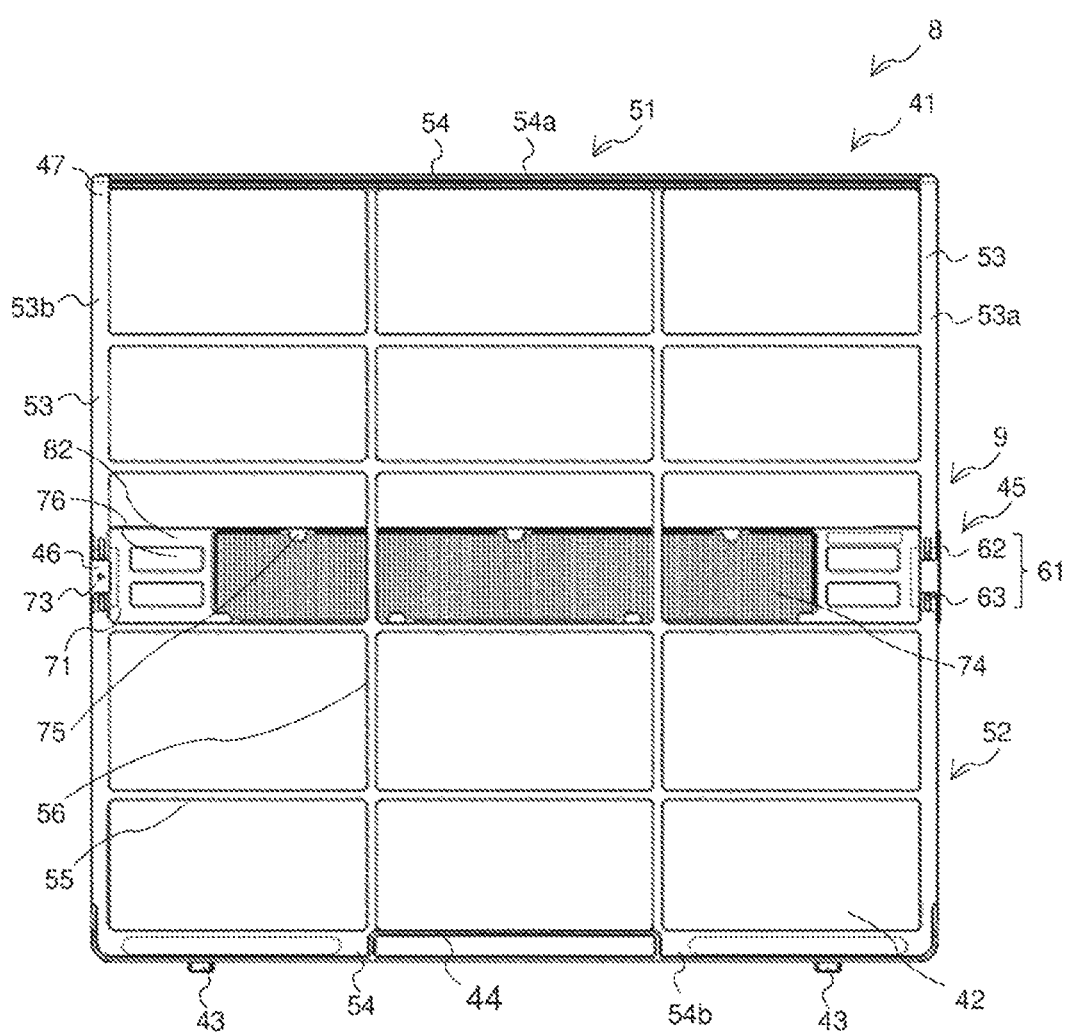
FIG. 11 is a front view of the air filter 8 and the air cleaning filter 9 according to Embodiment 1.
Figure 12:
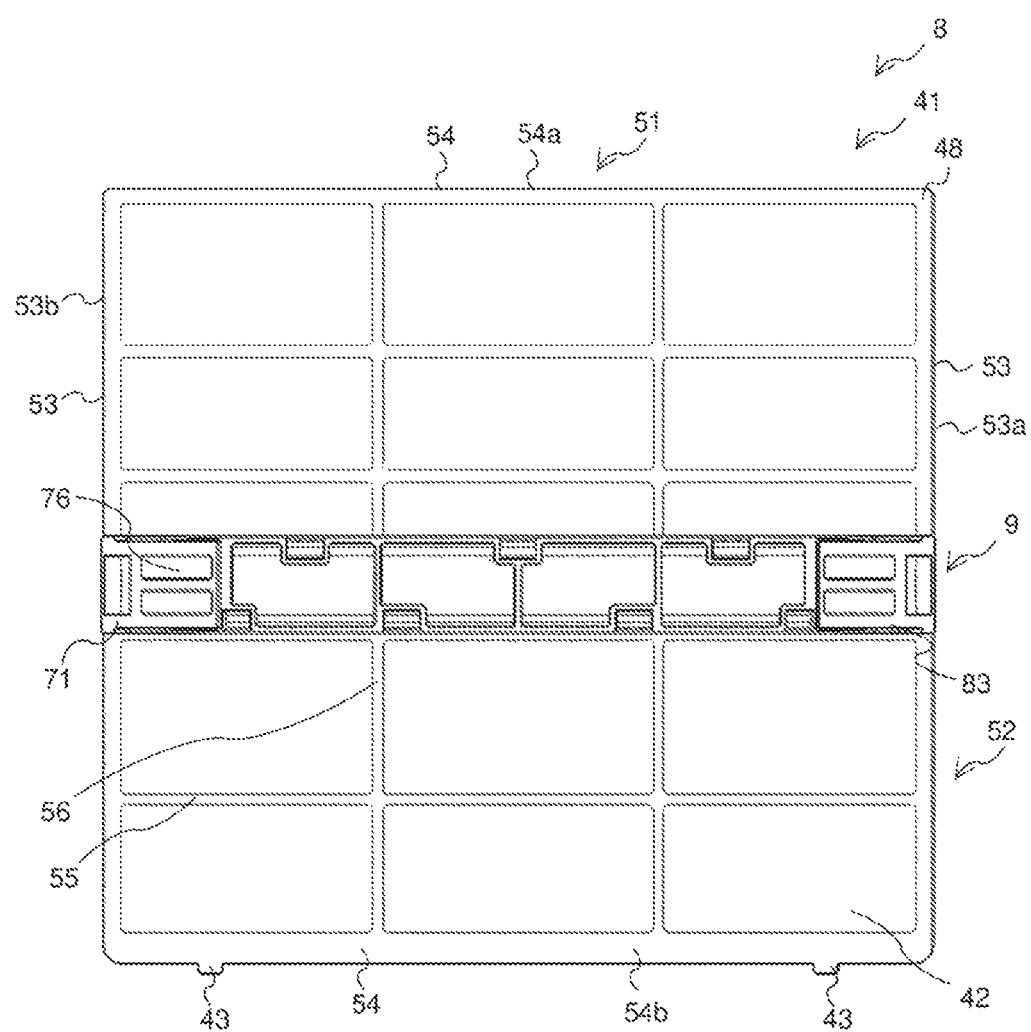
FIG. 12 is a rear view of the air filter 8 and the air cleaning filter 9 according to Embodiment 1.
Figure 13:
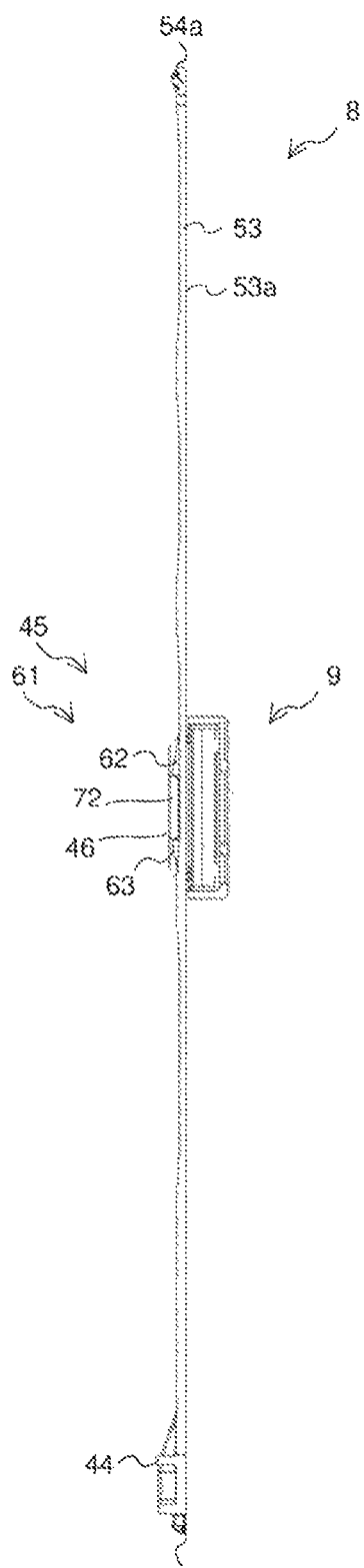
FIG. 13 is a side view of the air filter 8 and the air cleaning filter 9 according to Embodiment 1.
Figure 14:
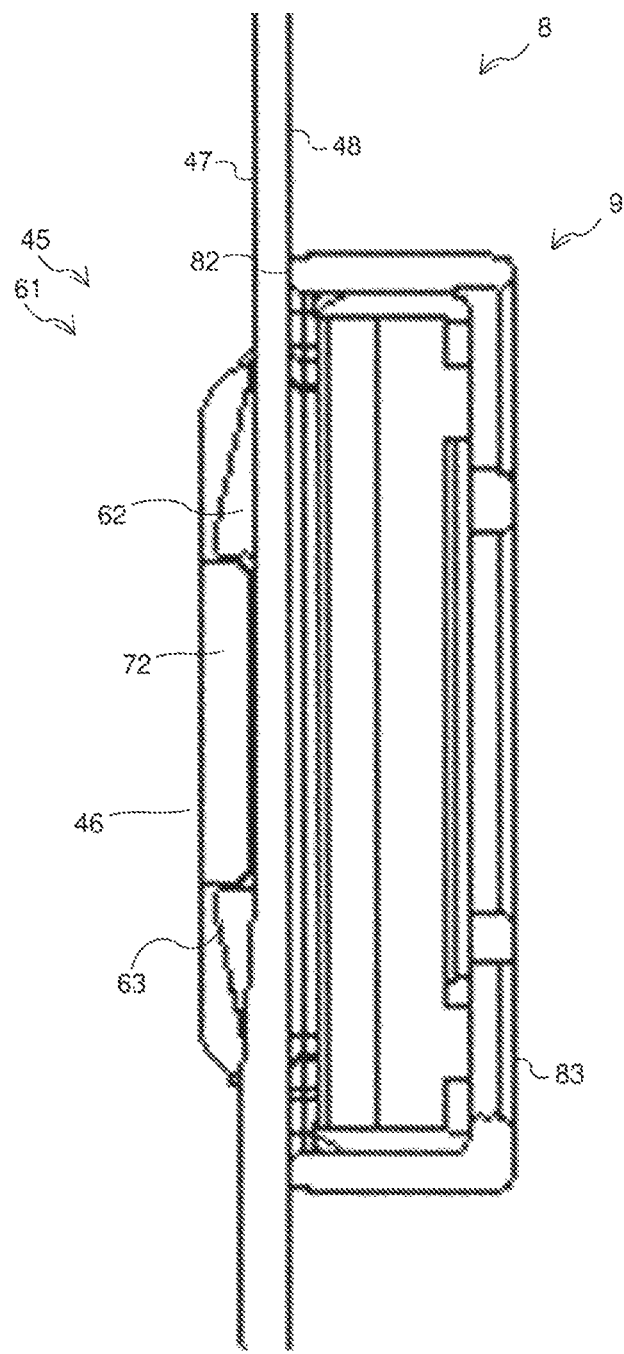
FIG. 14 is a side view of the air filter 8 and the air cleaning filter 9 according to Embodiment 1.

FIG. 11 is a front view of the air filter 8 and the air cleaning filter 9 according to Embodiment 1. FIG. 12 is a rear view of the air filter 8 and the air cleaning filter 9 according to Embodiment 1. FIG. 13 is a side view of the air filter 8 and the air cleaning filter 9 according to Embodiment 1. FIG. 14 is a side view of the air filter 8 and the air cleaning filter 9 according to Embodiment 1. With reference to FIGS. 11 to 14, the method for attaching the air cleaning filter 9 to the air filter 8 is now described. First, the air filter 8 is slightly warped in the lateral direction. Next, the latch portions 73 of the air cleaning filter 9 are aligned with the attachment grooves 46 of the air filter 8 such that the latch portions 73 fit in the attachment grooves 46, and the right-side outer frame 53a and the left-side outer frame 53b of the air filter 8 are inserted into respective spaces between the fixing portion 71 and each of the latch portions 73 of the air cleaning filter 9.

Warp of the air filter 8 is eliminated, so that the right-side outer frame 53a and the left-side outer frame 53b of the air filter 8 are fixed in the spaces between the fixing portion 71 and each of the latch portions 73 of the air cleaning filter 9. At this time, the air cleaning filter 9 is restricted from moving in the upward/downward direction by the protruding portions 61. In addition, the air cleaning filter 9 is restricted from moving in the rightward/leftward direction by the support portions 72. Further, the air cleaning filter 9 is restricted from moving in a direction toward which the front side 47 of the air filter 8 faces and in a direction toward which the back side 48 of the air filter 8 faces by the fixing portion 71 and the latch portions 73. That is, displacement of the air cleaning filter 9 from its attached position in any directions is minimized, including the upward/downward direction, the rightward/leftward direction, the direction toward which the front side 47 faces, and the direction toward which the back side 48 faces.

Even if the latch portions 73 of the air cleaning filter 9 are attached on a portion not formed with the attachment grooves 46, sliding the fixing portion 71 and the latch portions 73 along the upper sloped face 65 or the lower sloped face 67 helps the latch portions 73 to fit in the attachment grooves 46. As described above, various methods can be used to attach the air cleaning filter 9 to the air filter 8.

The method for attaching the air filter 8 to the indoor unit 2, and the method for detaching the air filter 8 from the indoor unit 2 are now described. The outer-casing panel 23 is provided with curved rails (not shown) running from the front side toward the rear of the top side. First, the air filter 8 is pushed up at the tab 44, so that the right-side outer frame 53a and the left-side outer frame 53b slide along their respective rails, and the upper outer frame 54a is inserted toward the rear of the top side of the outer-casing panel 23. Next, the insertion portions 43 of the air filter 8 are inserted into the insertion receiving portions provided on the front side portion of the outer-casing panel 23. With this method, the air filter 8 is easily attached to the housing 6. In contrast, at the time of detaching the air filter 8, first the insertion portions 43 are pulled out of the insertion receiving portions on the front side portion of the outer-casing panel 23. Next, the tab 44 of the air filter 8 is pulled, so that the air filter 8 is removed from the outer-casing panel 23 along the rails on the outer-casing panel 23. With this method, the air filter 8 is easily detached from the housing 6.

Operation of the indoor unit 2 is now described. Air in a room is first sucked from the air inlet 26 made up of the top air inlet 28 and the front air inlet 29. At this time, the air sucked from the air inlet 26 is cleaned by the air filter 8 removing dust from the air. The air, from which dust has been removed by the air filter 8, is further cleaned by the air cleaning filter 9 attached to the air filter 8 by removing particles contained in the air, such as pollen. Next, the cleaned air when passing through the indoor heat exchanger 10 exchanges heat with refrigerant, and then is delivered by an air-sending fan to the air outlet 27. Subsequently, the air delivered to the air outlet 27 is blown to the room with the flow direction adjusted by the up-down flow deflector plate 31 and the side-to-side flow deflector plates 32.

According to the present Embodiment 1, one side of the air filter 8 is totally flat. Due to this configuration, one side of the air filter 8 is not provided with such a protruding portion as to interfere with another air filter when the air filters are packed, so that the air filter 8 can be stacked on top of another with their flat sides facing each other. That is, the air filter 8 is easy to stack on top of another, and reduces the space required for being packed. Therefore, the packing efficiency improves, and consequently transportation-related costs can be decreased.

According to the present Embodiment 1, the thickness of the attachment portion 45 is equal to or less than the thickness of the tab 44. Due to this configuration, a portion of the air filter 8, provided with the tab 44, is thickest. In general, since a tab is used for handling a frame portion, the tab needs to have a sufficient size for a user to hold with his/her fingers. Therefore, in a case where the tab 44 has a necessary and sufficient thickness, when the attachment portion 45 has a thickness equal to or less than the thickness of the tab 44, then the air filter 8 can have a necessary and sufficient thickness in its entirety. That is, when the air filter 8 is stacked on top of another to be packed, only the tab 44 with a minimum thickness protrudes more than other parts. This maximizes the packing efficiency, and consequently can reduce transportation-related costs.

Further, according to the present Embodiment 1, the air cleaning filter 9 includes the fixing portion 71, the support portions 72, and the latch portions 73. With this configuration, the latch portions 73 of the air cleaning filter 9 fit in the attachment grooves 46 of the air filter 8, which minimizes displacement of the air cleaning filter 9 from its attached position in any directions. Therefore, the air cleaning filter 9 is reliably attached to the air filter 8.

According to the present Embodiment 1, each of the attachment portions 45 includes the upper protruding portion 62 and the lower protruding portion 63. The upper protruding portion 62 includes the upper perpendicular face 64 and the upper sloped face 65. The upper protruding portion 62 includes the lower perpendicular face 66 and the lower sloped face 67. Due to this configuration, even if the latch portions 73 of the air cleaning filter 9 are attached on the outer frame 51 of the air filter 8 at a portion not formed with the attachment grooves 46, the latch portions 73 can still fit in the attachment grooves 46 by being slid along the upper sloped face 65 or the lower sloped face 67. Therefore, the attachment portions 45 can improve the ease of use of the air filter 8.

Further, according to the present Embodiment 1, the fixing portion 71 is provided with the air holes 76. Due to this configuration, the air cleaning filter 9 can decrease an air resistance at a portion not provided with the air cleaning portion 74. Therefore, a reduction in the power consumption can be minimized. Note that, as described above, when the air holes 76 are formed on the fixing portion 71 bilaterally symmetrically with reference to the air cleaning portion 74, the air cleaning filter 9 can minimize imbalance in resistance to air passing through the air cleaning filter 9 in the rightward/leftward direction.

According to the present Embodiment 1, when the thickness of the space formed between the latch portion 73 and the fixing portion 71 is represented as $\alpha$, and the thickness of the outer frame 51 is represented as $\beta$, then $\beta+0.3$ mm$\leq\alpha\leq\beta+1.0$ mm is satisfied. On this condition, the air cleaning filter 9 is fixed to the air filter 8 with almost no gap being present between them. Therefore, even when a relatively large airflow amount is set to the air-conditioning apparatus 1, displacement and vibration of the air cleaning filter 9 can be minimized. Further, at the time of detaching the air filter 8 from the housing 6, a gap of 0.3 mm to 1.0 mm is still maintained between the air filter 8 and the air cleaning filter 9 attached to the air filter 8. Therefore, the air filter 8 is bent flexibly using the gap maintained between the air filter 8 and the air cleaning filter 9, and can thus be easily attached to and detached from the housing 6.

Figure 15:
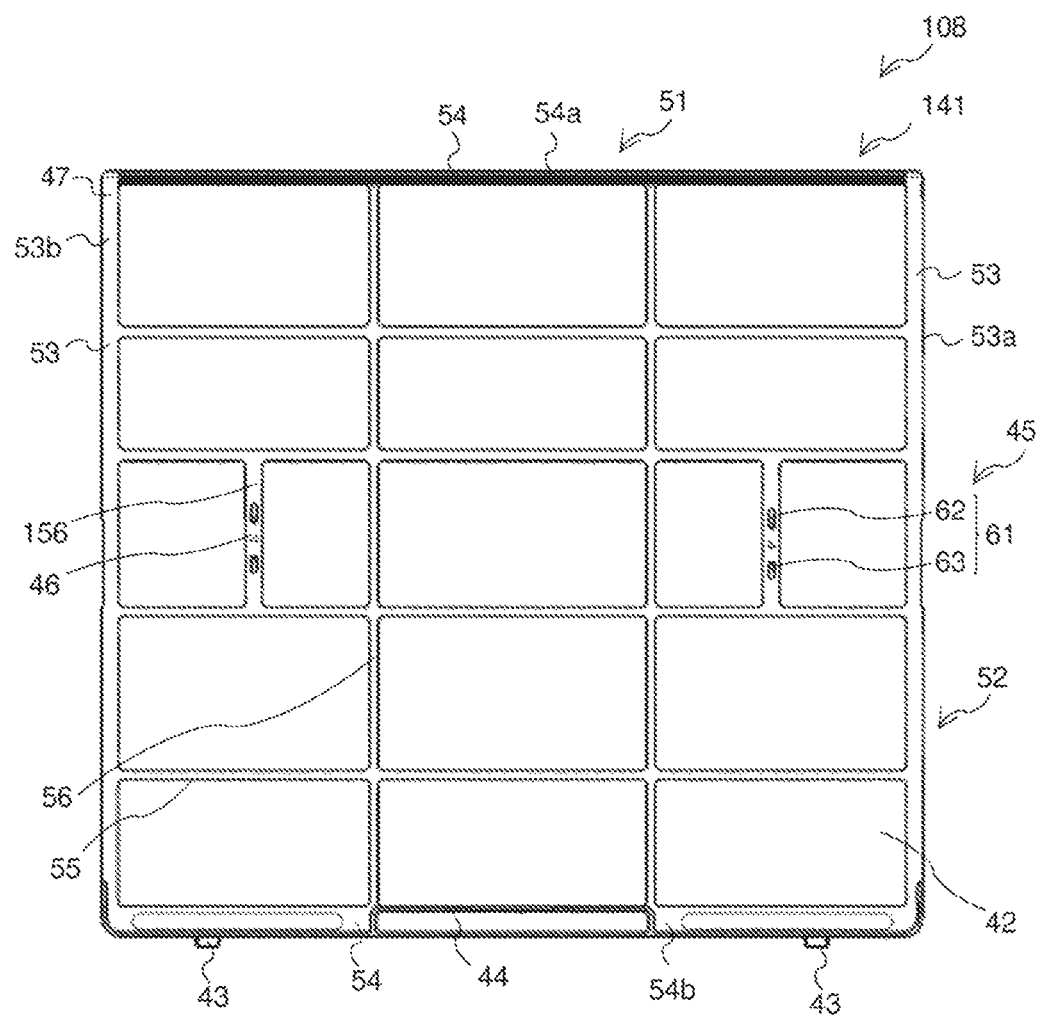
FIG. 15 is a front view of an air filter 108 according to Comparative Example.

FIG. 15 is a front view of an air filter 108 according to Comparative Example. As shown in FIG. 15, the air filter 108 according to Comparative Example is provided with vertical bars 156 extending in the upward/downward direction and connected to the horizontal inner frames 56. The attachment portions 45 are provided on the vertical bars 156, instead of being provided on the outer frame 51. In general, air cleaning filters are used mainly in high-end models. On the other hand, for the purpose of reducing production costs, low-end models may sometimes be equipped with an air filter intended for high-end models as a common component, although low-end models are not originally equipped with the air cleaning filter as standard. There is also a case where the air cleaning filter is available for low-end models as an optional component. In view of the above, various types of models need the attachment portion for an air cleaning filter to be attached. The vertical bars 156, provided with the attachment portions 45 for the air cleaning filter 9 to be attached, may become a resistance to the air passing through the air filter 8 if the air cleaning filter 9 is not equipped. For this reason, the air filter 108 of Comparative Example, including the vertical bars 156 provided with the attachment portions 45, causes an increase in the power consumption and a decrease in the air-conditioning capacity. It is thus difficult for the air filter 108 to be employed in various types of models.

In contrast to that, the attachment portions 45 in the present Embodiment 1 are provided at one side portion and the other side portion of the outer frame 51 on the other side of the outer frame 51. As described above, the air filter 8 does not include a vertical bar that may become a resistance to the air passing through the air filter 8 if the air cleaning filter 9 is not equipped. Therefore, an increase in the power consumption and a decrease in the air-conditioning capacity can be minimized. Further, since the air filter 8 does not need resin to be used for providing the vertical bars, costs can be reduced accordingly.

REFERENCE SIGNS LIST

1: air-conditioning apparatus, 2: indoor unit, 3: outdoor unit, 4: refrigerant pipe, 5: refrigerant circuit, 6: housing, 7:

flow deflector plate, 8: air filter, 9: air cleaning filter, 10: indoor heat exchanger, 11: indoor air-sending device, 12: compressor, 13: flow switching device, 14: outdoor heat exchanger, 15: outdoor air-sending device, 16: expansion unit, 21: front upper panel, 22: front lower panel, 23: outer-casing panel, 24: rear panel, 25: bottom panel, 26: air inlet, 27: air outlet, 28: top air inlet, 29: front air inlet, 31: up-down flow deflector plate, 32: side-to-side flow deflector plate, 41: frame portion, 42: dust collection portion, 43: insertion portion, 44: tab, 45: attachment portion, 46: attachment groove, 47: front side, 48: back side, 49: opening, 51: outer frame, 52: inner frame, 53: vertical outer frame, 53*a*: right-side outer frame, 53*b*: left-side outer frame, 54: horizontal outer frame, 54*a*: upper outer frame, 54*b*: lower outer frame, 55: vertical inner frame, 56: horizontal inner frame, 61: protruding portion, 62: upper protruding portion, 63: lower protruding portion, 64: upper perpendicular face, 65: upper sloped face, 66: lower perpendicular face, 67: lower sloped face, 71: fixing portion, 72: support portion, 73: latch portion, 74: air cleaning portion, 75: cleaning-portion fixing latch, 76: air hole, 81: opening, 82: front side, 83: back side, 108: air filter, 156: vertical bar

The invention claimed is:

1. An air filter comprising:
    a frame portion including an outer frame and an inner frame, the outer frame being a frame body forming an outer contour and formed with an opening, the inner frame being provided within the outer frame and configured to partition the opening of the outer frame into a grid shape, the frame portion having a back side and a front side opposite to the back side;
    a dust collection portion provided on the frame portion to cover sections surrounded by the outer frame and the inner frame, the dust collection portion being configured to adsorb dust;
    attachment portions provided on the frame portion and each including a plurality of protruding portions, each of which protrudes from the front side of the frame portion to extend in an upward/downward direction; and
    an air cleaning filter attached to each of the attachment portions, the air cleaning filter being configured to adsorb finer particles than dust, wherein the air cleaning filter includes
        a fixing portion extending along the back side of the frame portion, the fixing portion being a frame body forming an outer contour and formed with an opening,
        support portions connected to the fixing portion, and extending from the fixing portion toward the front side of the frame portion,
        latch portions connected to the support portions, each of the latch portions extending along the fixing portion between the plurality of protruding portions, such that the frame portion is held between the fixing portion at the back side of the frame portion and each of the latch portions at the front side of the frame portion, and
        an air cleaning portion provided in the fixing portion such that the air cleaning portion covers the opening of the fixing portion, the air cleaning portion being configured to adsorb finer particles than dust.

2. The air filter of claim 1, comprising
    a tab provided on the front side of the frame portion to be used to handle the frame portion.

3. The air filter of claim 2, wherein each of the attachment portions has a thickness equal to or less than that of the tab.

4. The air filter of claim 1, wherein the attachment portions are provided at one side portion and an other side portion on an other side of the outer frame.

5. The air filter of claim 1, wherein
    an upper protruding portion positioned uppermost of the plurality of protruding portions includes an upper perpendicular face extending perpendicularly to the front side of the frame portion, and an upper sloped face formed to extend obliquely upward from a tip end of the upper perpendicular face such that the frame portion becomes gradually thinner, the upper sloped face then connecting to the front side of the frame portion, and
    a lower protruding portion positioned lowermost of the plurality of protruding portions includes a lower perpendicular face extending perpendicularly to the front side of the frame portion, and a lower sloped face formed to extend obliquely downward from a tip end of the lower perpendicular face such that the frame portion becomes gradually thinner, the lower sloped face then connecting to the front side of the frame portion.

6. The air filter of claim 1, wherein the fixing portion is formed with an air hole, the air hole being an opening port through which air sucked in passes.

7. The air filter of claim 1, wherein in a direction perpendicular to the frame portion, when a thickness of a space formed between the fixing portion and each of the latch portions is represented as $\alpha$, and a thickness of the outer frame in an upward/downward direction is represented as $\beta$, then $\beta+0.3$ mm$\leq\alpha\leq\beta+1.0$ mm is satisfied.

8. An indoor unit of an air-conditioning apparatus, the indoor unit comprising:
    a housing formed with an air inlet through which air is sucked;
    an air filter provided in the housing to remove dust from air sucked through the air inlet, and comprising a frame portion including an outer frame and an inner frame, the outer frame being a frame body forming an outer contour and formed with an opening, the inner frame being provided within the outer frame and configured to partition the opening of the outer frame into a grid shape, the frame portion having a back side and a front side opposite to the back side; a dust collection portion provided on the frame portion and configured to adsorb dust; and attachment portions provided on the frame portion and each including a plurality of protruding portions, each of which protrudes from the front side of the frame portion to extend in an upward/downward direction;
    an air cleaning filter provided on the attachment portions of the air filter to remove finer particles than dust from air sucked through the air inlet, wherein
    the air cleaning filter includes
        a fixing portion extending along the back side of the frame portion, the fixing portion being a frame body forming an outer contour and formed with an opening,
        support portions connected to the fixing portion, and extending from the fixing portion toward a front side of the frame portion in a direction toward the air filter,
        latch portions connected to the support portions, each of the latch portions extending along the fixing portion between the plurality of protruding portions, such that the frame portion is held between the fixing portion at the back side of the frame portion and each of the latch portions at the front side of the frame portion, and an air cleaning portion provided in the fixing portion such that the air cleaning portion covers the opening of the fixing portion, the air cleaning portion being configured to adsorb finer particles than dust.

9. The indoor unit of an air-conditioning apparatus of claim 8, wherein the fixing portion is formed with an air hole, the air hole being an opening port through which air sucked from the air inlet passes.

10. The indoor unit of an air-conditioning apparatus of claim 8, wherein in a direction perpendicular to the frame portion, when a thickness of a space formed between the fixing portion and each of the latch portions is represented as $\alpha$, and a thickness of the outer frame in an upward/downward direction is represented as $\beta$, then $\beta+0.3$ mm$\leq\alpha\geq\beta+1.0$ mm is satisfied.

11. The indoor unit of an air-conditioning apparatus of claim 8, comprising a tab provided on the front side of the frame portion to be used to handle the frame portion.

12. The indoor unit of an air-conditioning apparatus of claim 11, wherein each of the attachment portions has a thickness equal to or less than that of the tab.

13. The indoor unit of an air-conditioning apparatus of claim 8, wherein the attachment portions are provided at one side portion and an other side portion on an other side of the outer frame.

14. The indoor unit of an air-conditioning apparatus of claim 8, wherein an upper protruding portion positioned uppermost of the plurality of protruding portions includes an upper perpendicular face extending perpendicularly to the front side of the frame portion, and an upper sloped face formed to extend obliquely upward from a tip end of the upper perpendicular face such that the frame portion becomes gradually thinner, the upper sloped face then connecting to the front side of the frame portion, and a lower protruding portion positioned lowermost of the plurality of protruding portions includes a lower perpendicular face extending perpendicularly to the front side of the frame portion, and a lower sloped face formed to extend obliquely downward from a tip end of the lower perpendicular face such that the frame portion becomes gradually thinner, the lower sloped face then connecting to the front side of the frame portion.

\* \* \* \* \*